(12) United States Patent
Kang

(10) Patent No.: US 6,874,798 B2
(45) Date of Patent: Apr. 5, 2005

(54) GOLF BAG CART

(76) Inventor: Pan-Gyu Kang, 916-62, Daechi-dong, Kangnam-ku, Seoul (KR), 139-280

(*) Notice: Subject to any disclaimer, the term of this patent is extended or adjusted under 35 U.S.C. 154(b) by 2 days.

(21) Appl. No.: 10/015,467

(22) Filed: Dec. 11, 2001

(65) Prior Publication Data

US 2002/0113385 A1 Aug. 22, 2002

Related U.S. Application Data

(63) Continuation-in-part of application No. 09/494,681, filed on Jan. 31, 2000, now Pat. No. 6,431,563.

(30) Foreign Application Priority Data

Dec. 13, 1999 (KR) .......................................... 99-57223

(51) Int. Cl.⁷ .............................................. B62B 1/00
(52) U.S. Cl. ............................... 280/47.18; 280/47.26; 280/DIG. 6
(58) Field of Search .......................... 280/47.18, 47.19, 280/47.24, 47.26, 47.27, 47.2, 47.315, 47.33, 47.131, 646, 652, 655, DIG. 6; 206/315.3, 315.7, 315.8; 248/96, 167, 168, 169, 171, 297.21, 473, 688

(56) References Cited

U.S. PATENT DOCUMENTS

| | | | |
|---|---|---|---|
| 2,326,482 A | | 8/1943 | Moffitt ......................... 280/51 |
| 2,443,847 A | | 6/1948 | Williamson ............ 280/DIG. 6 |
| 2,699,951 A | | 1/1955 | Gans ...................... 280/DIG. 6 |
| 2,732,218 A | | 1/1956 | Resch ................... 280/DIG. 6 |
| 3,195,844 A | * | 7/1965 | Roeplke ...................... 248/96 |
| 3,580,533 A | | 5/1971 | Nordland ............... 280/DIG. 6 |
| 4,822,071 A | | 4/1989 | Wildegren ................... 280/646 |
| 5,074,577 A | * | 12/1991 | Kim ........................... 280/646 |
| 5,407,155 A | * | 4/1995 | Chung ......................... 248/96 |
| 5,451,072 A | * | 9/1995 | Weng .......................... 280/646 |
| 5,549,263 A | * | 8/1996 | Maeng ......................... 248/96 |
| 5,762,189 A | * | 6/1998 | Reimers .................... 206/315.7 |
| 5,799,967 A | | 9/1998 | Lin ............................. 280/646 |
| 5,829,585 A | * | 11/1998 | Kao et al. ................. 206/315.3 |
| 5,829,719 A | * | 11/1998 | Han ............................ 248/96 |
| 5,887,833 A | * | 3/1999 | Sundara et al. ............... 248/96 |
| 5,934,624 A | * | 8/1999 | Suk ............................. 248/96 |
| 6,007,031 A | * | 12/1999 | Tang ........................... 248/96 |
| 6,050,592 A | | 4/2000 | Kim ........................... 280/652 |
| 6,168,123 B1 | * | 1/2001 | Stein et al. .................. 248/96 |
| 6,431,563 B1 | | 8/2002 | Kang ....................... 280/47.18 |

FOREIGN PATENT DOCUMENTS

CA  483101  5/1952  ............ 280/DIG. 6

* cited by examiner

*Primary Examiner*—Christopher P. Ellis
*Assistant Examiner*—Gerald B. Klebe
(74) *Attorney, Agent, or Firm*—Baker Botts LLP

(57) ABSTRACT

A golf bag cart includes a bag having an inner space, a wide lateral surface, and a narrow bottom surface. A cart support is provided on which the bag is loaded. A pressurizing member is fixed to the cart support such that the pressurizing member is rotated by a predetermined angle. The pressurizing member is pressurized against the earth and endures the weight of the bag when the bag is inclined by a predetermined angle. A plurality of left and right leg members are movably fixed to a middle portion of the cart support via a fixture such that the leg members are arranged to form a predetermined angle with respect to the fixture. The fixture is rigidly fixed to the cart support. The leg members are folded by way of self weight when the bag is erected. Wheel members are fixed to free ends of the left and right leg members via brackets such that the wheel members are rotated. The wheel members are folded by way of self weight together with the left and right leg members when the bag is erected. A plurality of link members each have an end coupled to the pressurizing member, and an opposite end coupled to the leg members. The link members unfold the leg members while being elevated when the pressurizing member is pressurized against the earth. A clasp is slidably installed on the cart support for fixing the bag to the cart support.

10 Claims, 19 Drawing Sheets

GOLF BAG CART

This is a continuation-in-part of prior application Ser. No. 09/494,681 filed Jan. 31, 2000, now U.S. Pat. No. 6,431,563.

BACKGROUND OF THE INVENTION (a) Field of the Invention

The present invention relates to a golf bag cart and, more particularly, to a golf bag cart which has a simplified structure for insuring convenient use and reduced production cost, and easily moves free of spatial restriction.

(b) Description of the Related Art

Generally, golf bags are carried by picking up a handle or shouldering a shoulder string. In this structure, when the user puts several numbers of golf clubs in the golf bag, and carries it, he becomes easily tired because the golf bag is very heavy due to its own weight as well as the weight of the golf clubs.

In order to solve the above problem, a separate cart may be provided to carry the golf bag. However, in this case, the golf bag and the cart should be separately brought while coming to the golf field so that the burden of carrying may become increased.

In this connection, it has been proposed that the cart should be made in a body with the golf bag. Such a body with the cart and the golf bag can be referred to as the "golf bag cart."

For instance, the golf bag cart includes a bag for receiving several numbers of golf clubs, upper and lower fixation members fixed to the bag, and a support detachably coupled to the upper and lower fixation members at its upper and lower ends. A pair of leg members are coupled to the support at their one ends via a first bracket such that they can be rotated with a predetermined angle with respect to each other. Wheels are coupled to the opposite ends of the leg members such that they can be rotated. A holding handle is coupled to an upper portion of the support at its one end via a second bracket such that it can be rotated. A pair of link members are coupled to the holding handle at their one ends and to the leg members at their opposite ends such that they can be rotated.

A locking member is provided in the holding handle to detachably fix the holding handle to the upper fixation member while keeping the outstretched state of the leg members to be constant.

In the above structured golf bag cart, when the holding handle is elevated while rotating around the second bracket, the link members are operated to thereby rotate the leg members around the first bracket and outstretch them. When the leg members are completely outstretched, the locking member of the holding handle is inserted into a locking groove formed at the upper fixation member to keep the outstretched state of the leg members to be constant.

In contrast, when the user intends to fold the holding member and the leg members, he releases the locking state of the locking member and rotates the holding handle around the second bracket to thereby descend it. At this time, the leg members are rotated downwards, and adhere to the bag.

However, such a golf bag cart involves complicated structure that makes it difficult for the user to handle it in a convenient way. Furthermore, the golf bag cart cannot easily move while keeping the folded state of the leg members to be constant. Particularly, when the golf bag cart should move in such a narrow place as a stairway, it cannot easily move with the outstretched leg members.

In addition, since the holding handle or the shoulder string for picking up or shouldering the cart golf bag to carry it is positioned on the front surface of the bag opposite to the surface sided with the leg members, the leg members are liable to be swayed or outstretched due to their own weight, causing possible safety problems.

SUMMARY OF THE INVENTION

It is an object of the present invention to provide a golf bag cart which has a simplified structure, and freely moves in a convenient way.

It is another object of the present invention to provide a golf bag cart which can effectively prevent the cart structure from being swayed while moving.

These and other objects may be achieved by a golf bag cart including a bag having an inner empty space for receiving a plurality of golf clubs, a wide lateral surface, and a narrow bottom surface. A cart support is longitudinally fixed to the lateral surface of the bag via upper and lower brackets. A pressurizing member is fixed to the bag while positioning just below the cart support such that it is rotated by a predetermined angle. The pressurizing member is pressurized against the earth and endures the weight of the bag when the bag is inclined by a predetermined angle. A plurality of left and right leg members are movably fixed to a middle portion of the cart support via a fixture such that they are arranged to form a predetermined angle with respect to the fixture. The fixture is rigidly fixed to the cart support. The leg members are folded by way of their own weight when the bag is erected. Wheel members are fixed to free ends of the left and right leg members via brackets such that the wheel members are rotated. The wheel members are folded by way of their own weight together with the left and right leg members when the bag is erected. A plurality of link members each have an end coupled to the pressurizing member, and an opposite end coupled to the leg members. The link members unfold the leg members while being elevated when the pressurizing member is pressurized against the earth.

An elastic member is tensioned between the left and right leg members to push the folded leg members toward the cart support when the bag is erected. A holding handle and a shoulder string are attached to the bag or the cart support such that they are positioned together with the cart support on the same surface of the bag to prevent swaying of the folded leg members when the bag moves. A control handle is formed at a top portion of the cart support to control the direction of the bag. The control handle is pulled out of an upper cover when the bag containing the golf clubs is covered with the upper cover.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

Figure 1:
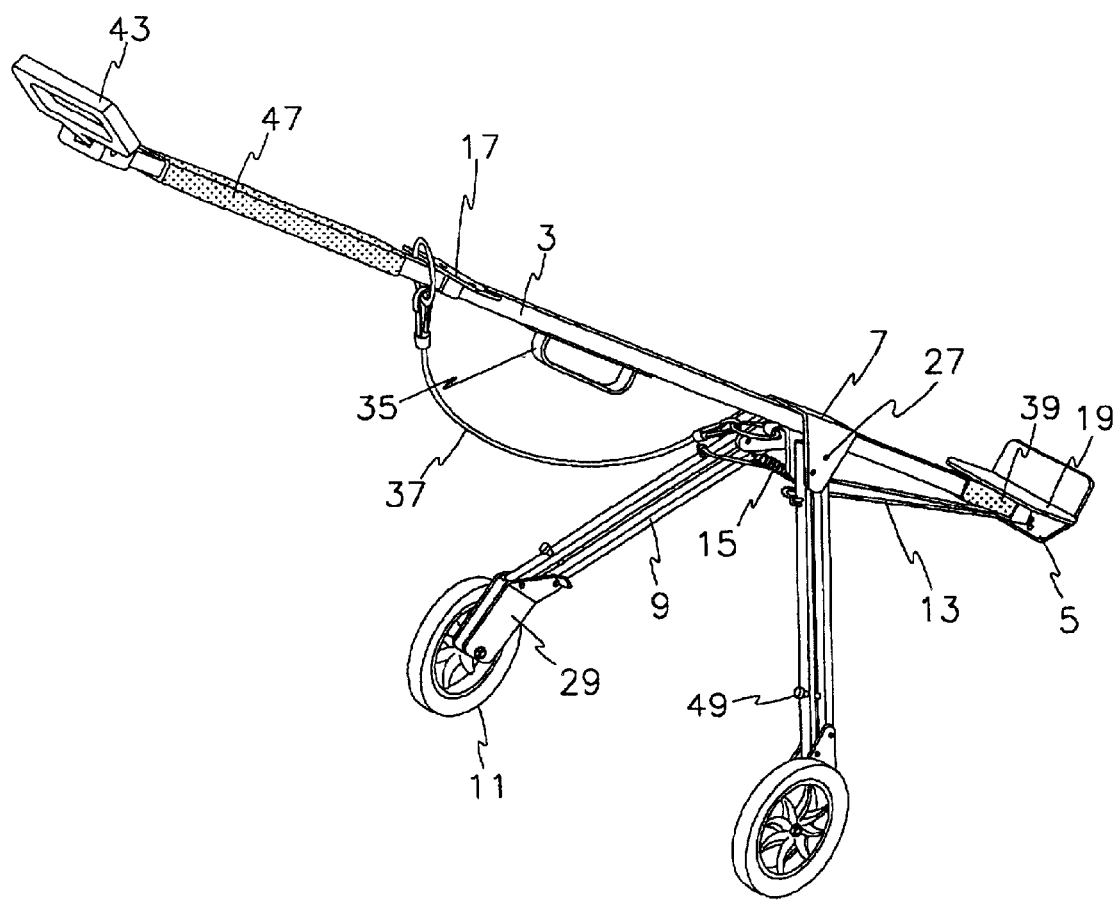
FIG. 1 is a partial perspective view of a golf bag cart with a pressurizing member and leg members according to a first preferred embodiment of the present invention.

Preferred embodiments of this invention will be explained with reference to the accompanying drawings.

FIGS. 1 to 9 are views illustrating a golf bag cart according to a first preferred embodiment of the present invention.

The golf bag cart has a bag 1 with an inner empty space for receiving several numbers of golf clubs, a wide lateral surface, and a narrow bottom surface 2.

A cart support 3 is longitudinally fixed to the lateral surface of the bag 1 with a predetermined length. A pressurizing member 5 is also fixed to the lateral surface of the bag 1 just below the cart support 3 such that it can be rotated by a predetermined angle. When the bag 1 is inclined by a predetermined angle, the pressurizing member 5 is pressurized against the earth while enduring the weight of the bag.

A plurality of left and right leg members 9 are movably fixed to a middle portion of the cart support 3 via a fixture 7 such that they are arranged to form a predetermined angle with respect to the fixture 7. The leg members 9 can be folded due to their own weight when the bag 1 is erected. The fixture 7 is preferably positioned at the middle or lower portion of the bag 1, and rigidly fixed to the cart support 3.

Wheel members 11 are fixed to free ends of the leg members 9 such that they can be rotated. The wheel members 11 contact the earth together with the pressurizing member 5 when the bag 1 is inclined and the leg members 9 are unfolded. In contrast, when the bag 1 is erected, the wheel members 11 are folded together with the leg members 9 due to their own weight.

A plurality of link members 13 are coupled to the pressurizing member 5 at their one ends, and also coupled to the leg members 9 at their opposite ends. When the pressurizing member 5 is pressurized against the earth, the link members 13 coupled to the pressurizing member 5 are elevated to thereby unfold the leg members 9 by a predetermined angle.

An elastic member 15 is tensioned between the left and right leg members 9 to push the folded leg members 9 toward the cart support 3 when the bag 1 is erected.

Upper and lower brackets 17 and 19 are fixed to the lateral surface of the bag 1 via bolts or rivets, and the cart support 3 is securely coupled to the upper and lower brackets 17 and 19 via bolts or rivets.

The cart support 3 is pipe-shaped with an inner empty space such that it can have light weight and good rigidity. The section of the cart support 3 is preferably rectangular-shaped such that the cart support 3 can be securely coupled to the bag 1 in a simplified manner.

Figure 6:
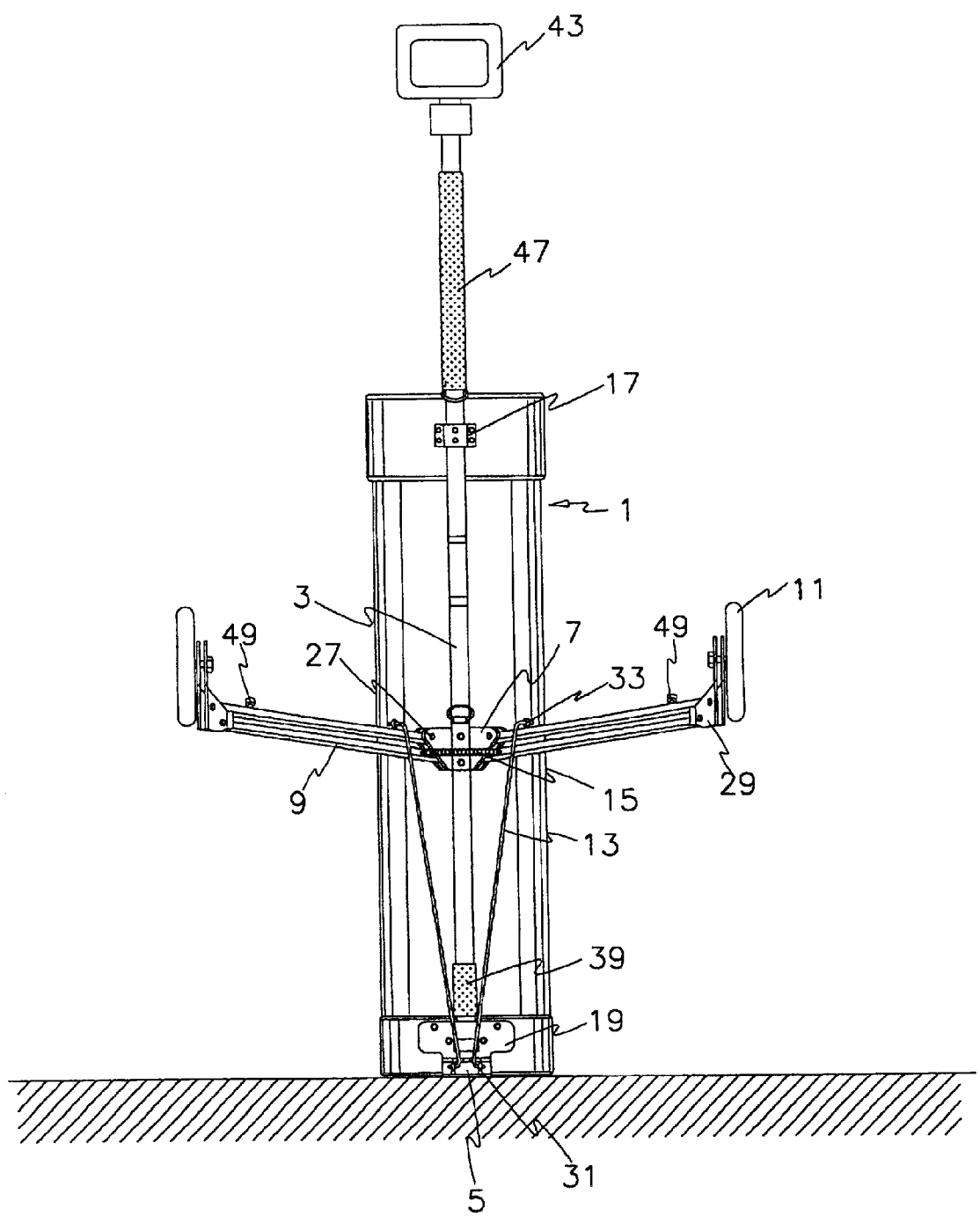
FIG. 6 is a front view of the golf bag cart shown in FIG. 1 where the leg members are in an outstretched state.

The fixation of the pressurizing member 5 to the lateral surface of the bag 1 is realized by the lower bracket 19 and a hinge shaft 21. As shown in FIG. 6, first and second fixation protrusions 23 and 25 are formed at the lower bracket 19 to fix the hinge shaft 21 thereto.

The fixture 7 for fixing the leg members 9 to the cart support 3 is fixed to the middle portion of the cart support 3 via bolts or rivets, and the leg members 9 are fixed to the fixture 7 via a hinge shaft 27 such that they can be rotated.

Two or more of the leg members 9 are arranged either in the left side or in the right side with respect to the fixture 7 such that they can substantially endure the weight of the bag 1 containing golf clubs and are no longer outstretched when the angle between each leg member 9 and the cart support 3 is 90° or more.

As is in the cart support 3, the leg member 9 may be structured to have an inner empty space and a rectangular-shaped section.

Figure 9:
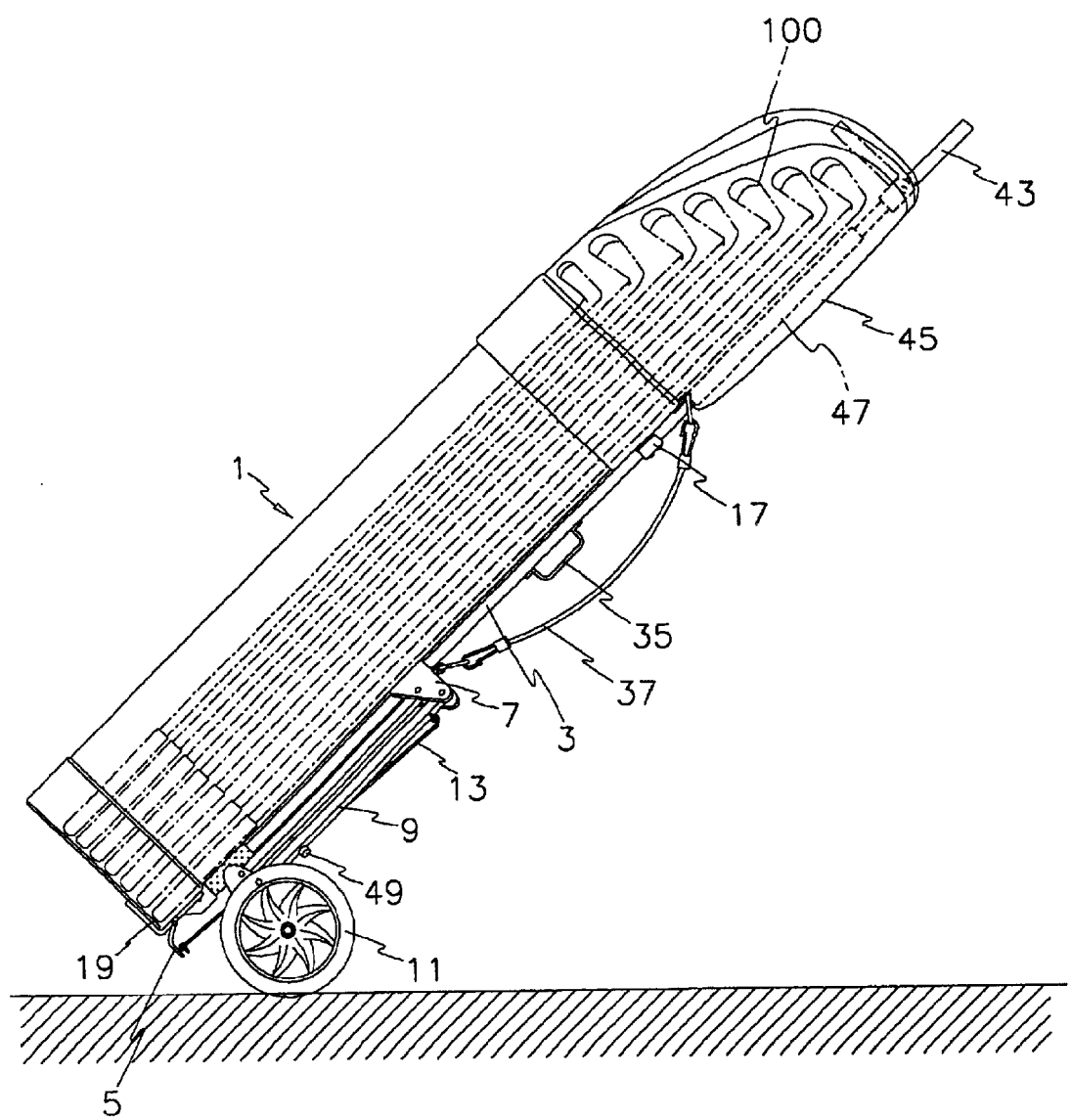
FIG. 9 is a side view of the golf bag cart shown in FIG. 1 with an upper cover.

The fixation of the wheel members 11 to the free ends of the leg members 9 is realized by brackets 29. The brackets 29 are fixed to the free ends of the leg members 9 such that they can be rotated. When the bag 1 is erected, the wheel members 11 are folded together with the leg members 9 by their own weight. Furthermore, as shown in FIG. 9, when the bag 1 is rapidly inclined such that the pressurizing member 5 does not exert any pressurizing force, the wheel members 11 contact the earth, and moves thereon.

The position of the wheel members 11 is preferably established such that they do not directly contact the bag 1 while placing over the lowest portion of the pressurizing member 5 when the leg members are completely folded. This structure makes it possible that the resulting golf bag cart moves even at such a narrow place as a stairway.

An angle between the bag 1 and each leg member 9 is established to be in the range of 90–130 degrees. In this angular range, the leg member 9 cannot be easily folded when the golf bag cart moves, and can endure the weight of the bag 1 containing golf clubs when the golf bag cart comes to a standstill on the earth via the pressurizing member 5 and the wheel members 11.

Each link member 13 is bar-shaped with bent ends that are movably hooked in first and second hinge holes 31 and 33 formed at the pressurizing member 5 and the leg member 9, respectively.

A holding handle 35 and a shoulder string 37 for picking up or shouldering and carrying the bag 1 are attached to the bag 1 or the cart support 3 such that they are arranged on the lateral side of the bag 1 with the cart support 3. In such an arrangement, the swaying of the folded leg members 9 is maximally prevented while minimizing the required elastic force of the elastic member 15. It is preferable that at least one end portion of the holding handle 35 and the shoulder string 37 surrounds the cart support 3.

The lower end portion of the cart support 3 is covered with a softening member 39 to minimize noise occurring when the bracket 29 of the leg members 9 contacts the cart support 3 and to prevent abrasion thereof.

A stopper 41 (not shown in FIG. 6, but shown in FIG. 7) is provided at the side of the bracket 29 of the leg members 9 facing the cart support 3. When the leg members 9 are folded toward the cart support 3, the stopper 41 contacts the cart support 3 to thereby limit movement of the leg members 9. The stopper 41 may be covered with a softening member to minimize noise when contacting the cart support 3 and to prevent abrasion thereof.

A control handle 43 is formed at the top portion of the cart support 3 to easily control the direction of the bag 1 when the user carries the golf bag cart. As shown in FIG. 9, the control handle 43 is structured such that when the bag 1 containing golf clubs is covered with an upper cover 45, the user rotates the control handle 43, and pulls it out of the upper cover 45 to operate it.

A covering member 47 formed with cloth or leather surrounds the upper portion of the cart support 3 over the bag 1 to prevent noise occurring when the cart support 3 collides with heads of the golf clubs contained in the bag 1 and abrasion thereof.

A stopper 49 is fixed to each of the left and right leg members 9 to define the angle between the neighboring leg members 9. When the left or right leg members 9 are outstretched by a predetermined angle, the stopper 49 fixed to one of the left or right leg members 9 contacts the neighboring leg member 9 to thereby define the angle between them. It is preferable that the stopper is screw-fixed to the leg member 9 to control such an angle.

In operation, when the bag 1 is inclined so that the pressurizing member 5 is rotated around the hinge shaft 21 and pressurized against the earth, the link members 13 coupled to the pressurizing member 5 are elevated while rotating around the first and second hinge holes 31 and 33.

The leg members 9 coupled to the link members 13 are outstretched from the fixture 7 via the hinge shafts 27, and the elastic member 15 interconnecting the leg members 9 is widened.

Figure 2:
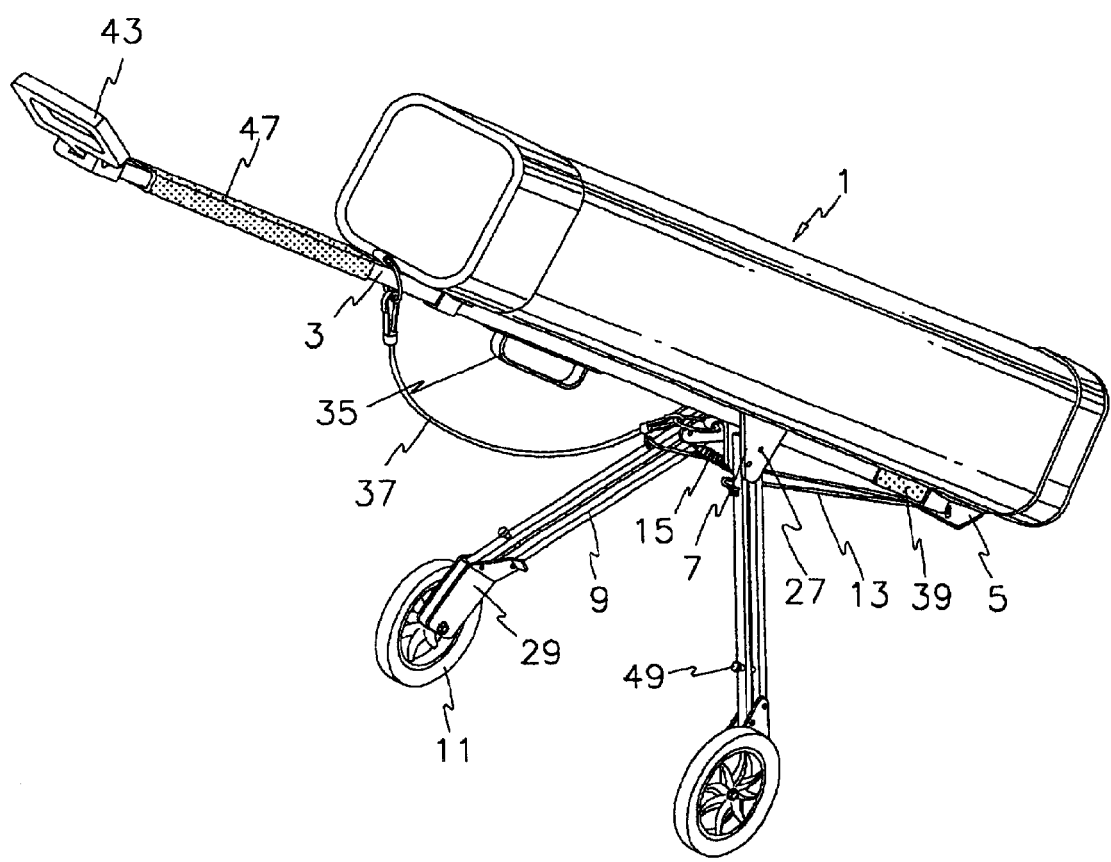
FIG. 2 is a perspective view of the golf bag cart shown in FIG. 1.
Figure 3:
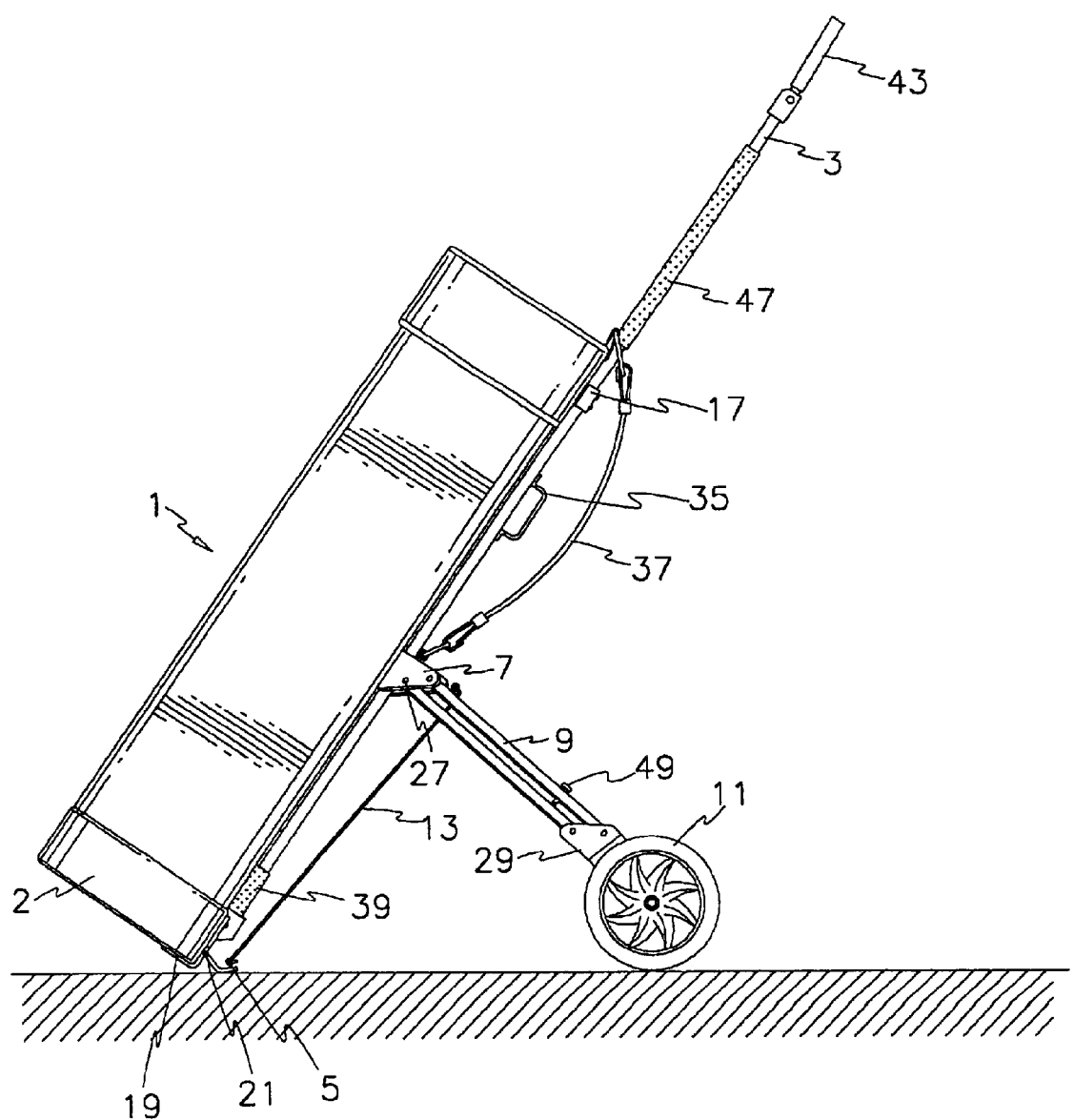
FIG. 3 is a side view of the golf bag cart shown in FIG. 1 at its inclined state where the pressurizing member and leg members contact the earth.

As shown in FIG. 2, in case the wheel members 11 contacts the earth, the pressurizing member 5 and the two wheel members 11 form a predetermined angle with respect to each other, and support the bag 1 at three points.

Figure 4:
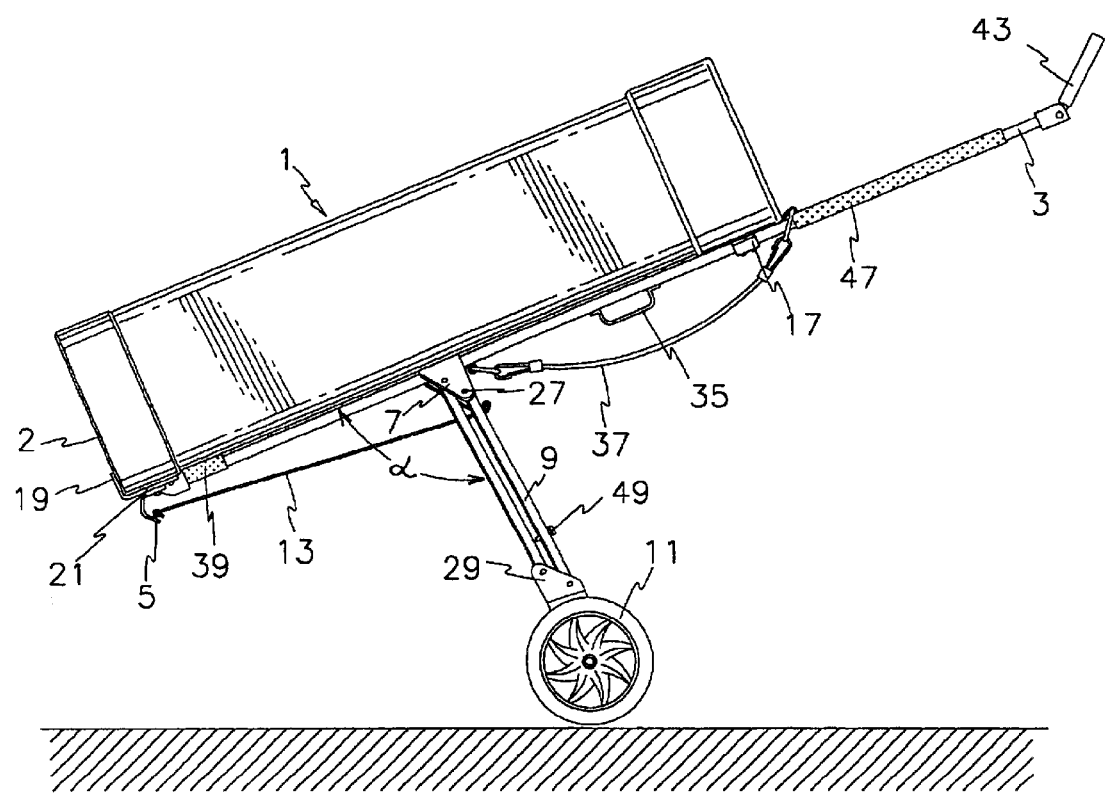
FIG. 4 is a side view of the golf bag cart shown in FIG. 1 at its inclined state where the leg members contact the earth.

When the user intends to move the bag 1, he grips the control hand 43 and inclines the upper portion of the bag 1 such that the pressurizing member 5 becomes distant from the earth while leaving out the wheel members 11 on the earth. As a result, as shown in FIG. 4, only the wheel members 11 contact the earth so that the user can easily move the bag 1.

Since the leg members 9 are outstretched by 90 degrees or more with respect to the cart support 3, the folding of the leg members 9 is limited so that the moving of the bag 1 can be fluently performed.

Figure 5:
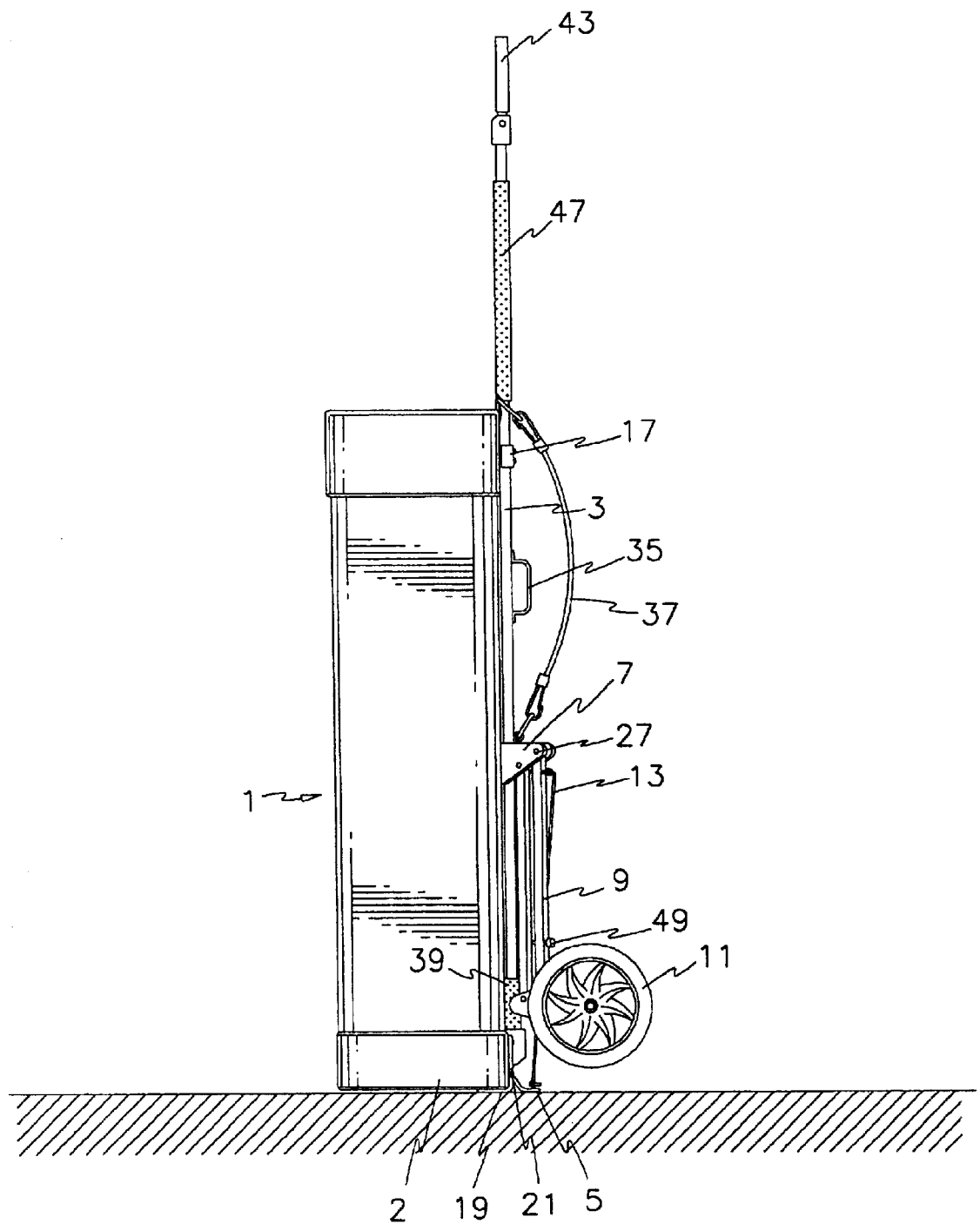
FIG. 5 is a side view of the golf bag cart shown in FIG. 1 at its erected state.
Figure 7:
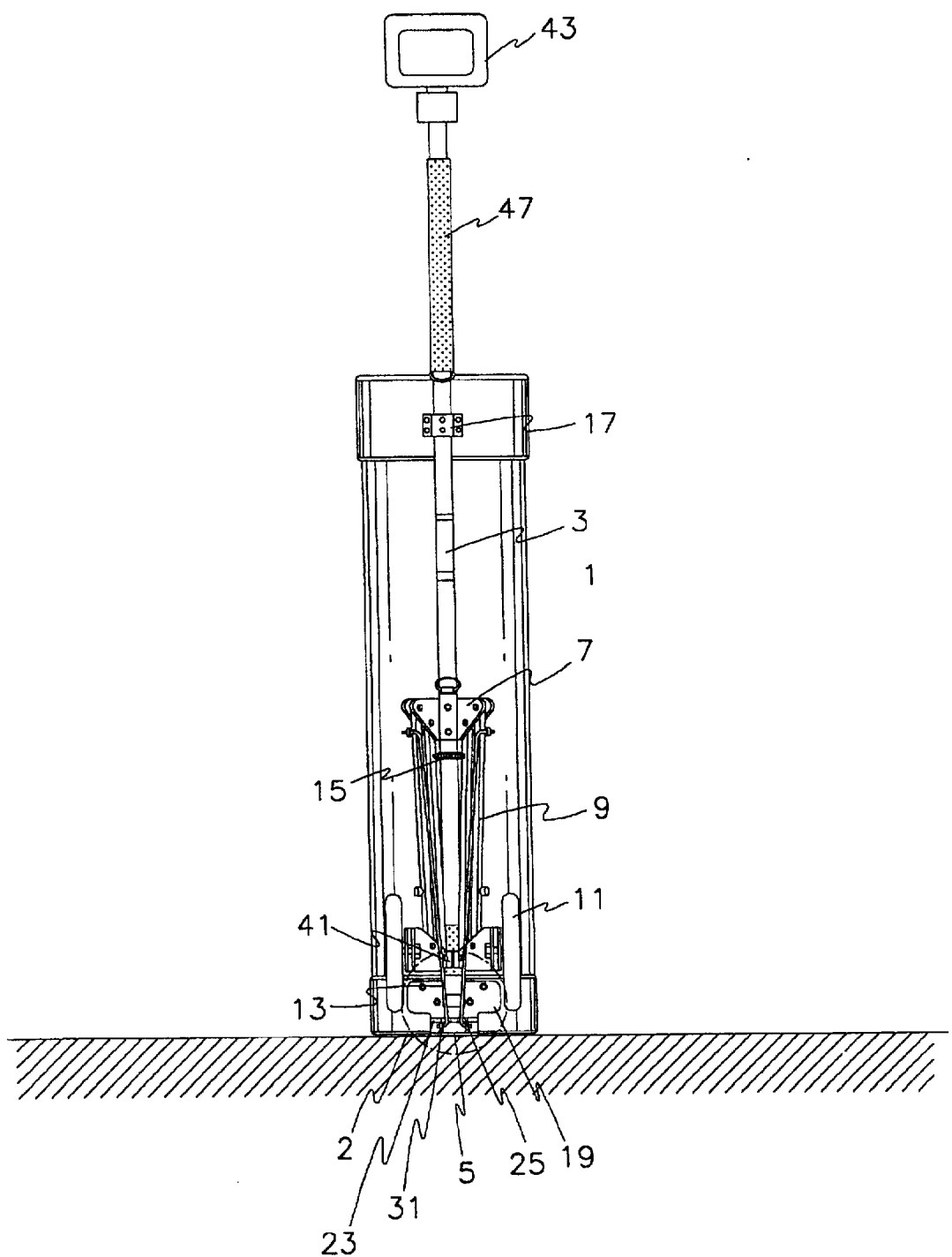
FIG. 7 is a front view of the golf bag cart shown in FIG. 1 where the leg members are in a folded state.
Figure 8:
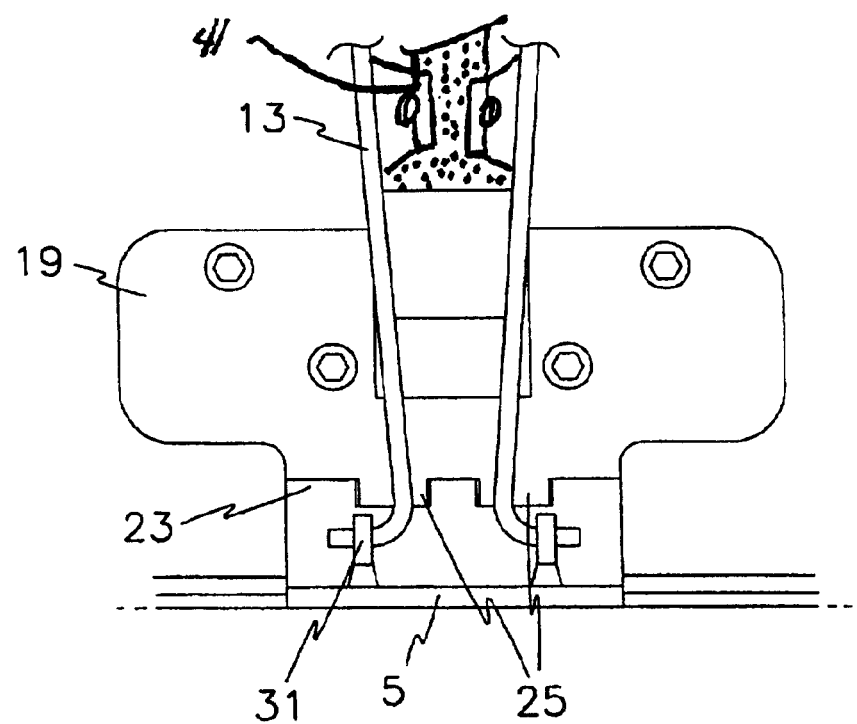
FIG. 8 is a partial amplified view of the golf bag cart shown in FIG. 1.

In case the wheel members 11 or the bag 1 are not used, as shown in FIGS. 5 and 7, as the bag 1 is erected to be perpendicular to the earth and the pressurizing member 5 does not exert any pressurizing force, the leg members 9 and the wheel members are folded, and return to their initial position due to their own weight.

At this time, the link members 13 rotate around the first and second hinge holes 31 and 33, and return to their original position while descending to the lower portion of the bag 1. The folded leg members 9 tightly adhere to the cart support 3 owing to the elastic force of the elastic member 15. The further movement of the leg members 9 is limited by the aforementioned stopper 41 so that noise or abrasion can be prevented.

Particularly, even when the bag 1 is carried by picking up the holding handle 35 or shouldering the shoulder string 37, the swaying of the leg members 9 does not occur because they are arranged at the lateral surface of the bag 1 where the leg members 9 are positioned.

Furthermore, in case the user intends to move the golf bag cart in such a narrow place as a stairway while folding the leg members 9, he rapidly inclines the bag 1 by a predetermined angle such that the pressurizing member 5 does not exert any pressurizing force and only the wheel members 11 contact the earth. In this way, the golf bag cart can be moved in a state that only the wheel members 11 contact the earth.

In the following preferred embodiments, other components of the golf bag cart are the same as those related to the first preferred embodiment except that the position of the pressurizing member varies or spacers are newly introduced.

Figure 10:
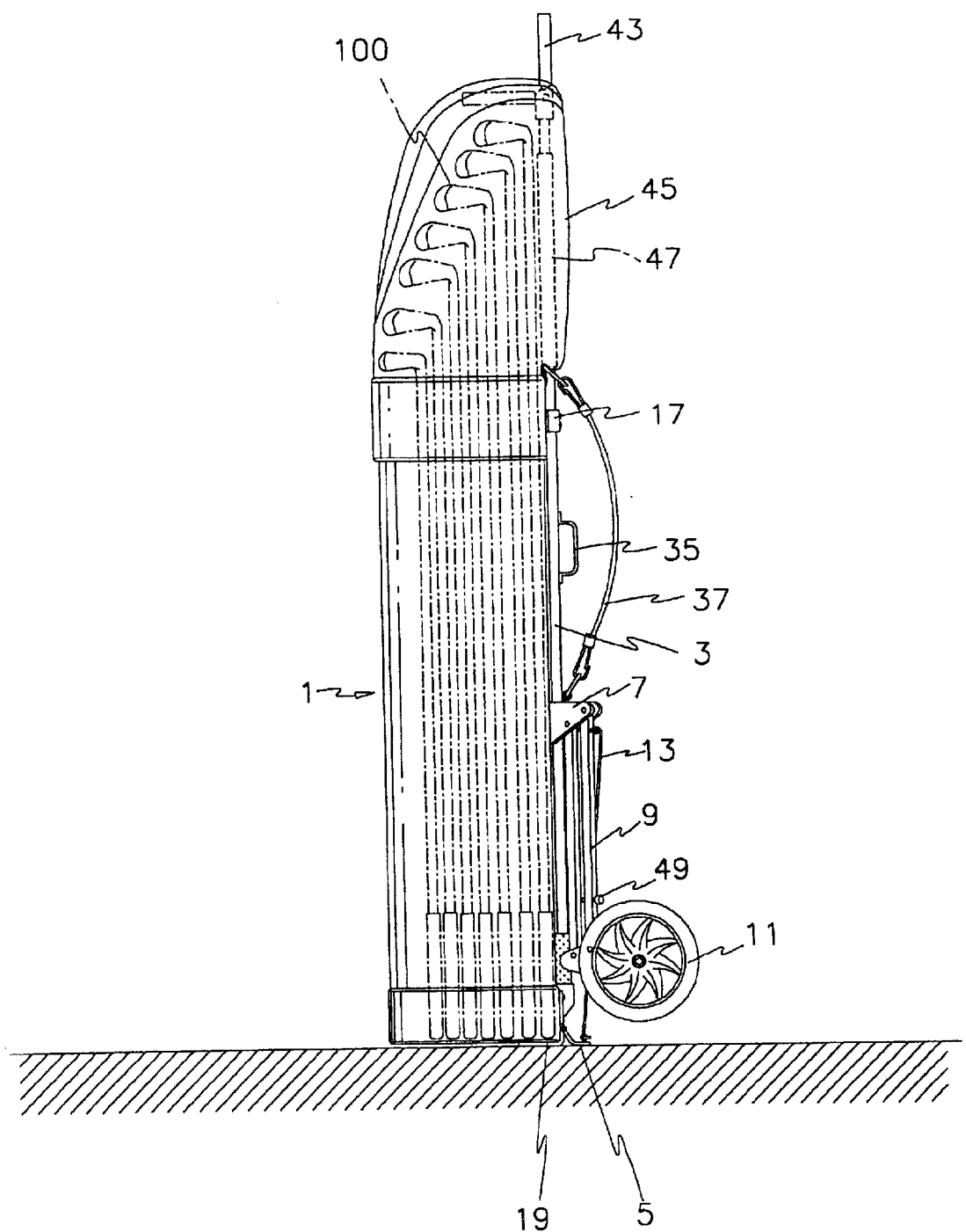
FIG. 10 is a side view of a golf bag cart according to a second preferred embodiment of the present invention.

FIG. 10 is a side view of a golf bag cart according to a second preferred embodiment of the present invention. As shown in FIG. 10, the pressurizing member 5 is directly hinge-coupled to the lower end portion of the lateral surface of the bag body 1.

Figure 11:
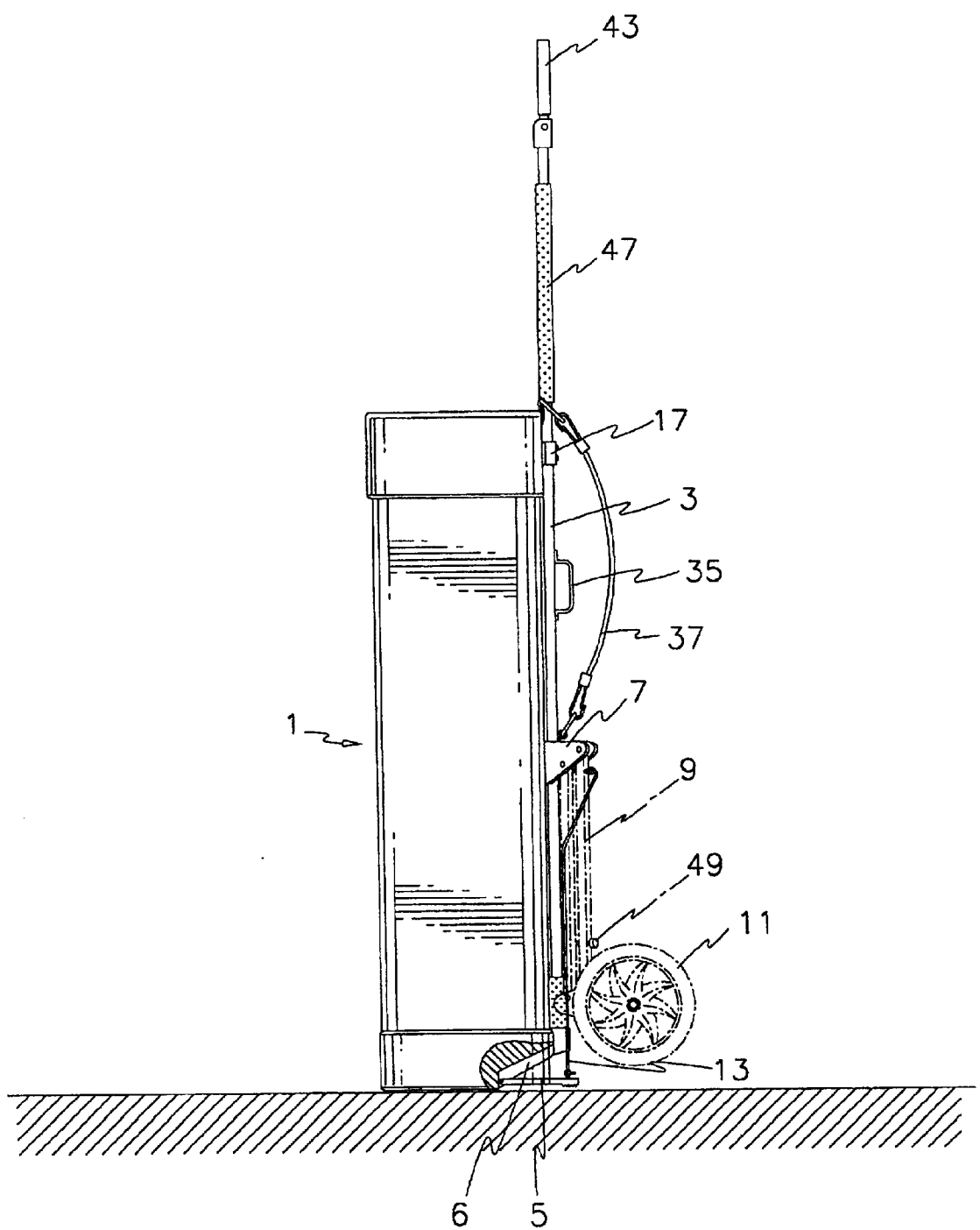
FIG. 11 is a side view of a golf bag cart according to a third preferred embodiment of the present invention.

FIG. 11 is a side view of a golf bag cart according to a third preferred embodiment of the present invention. As shown in FIG. 11, the bottom surface 2 of the bag 1 is formed with an inclined portion 6. The pressurizing member 5 is connected such that one end of the pressurizing member 5 is integrally connected to the inclined portion 6 and the other end of the pressurizing member 5 moves freely up and down.

Figure 12:
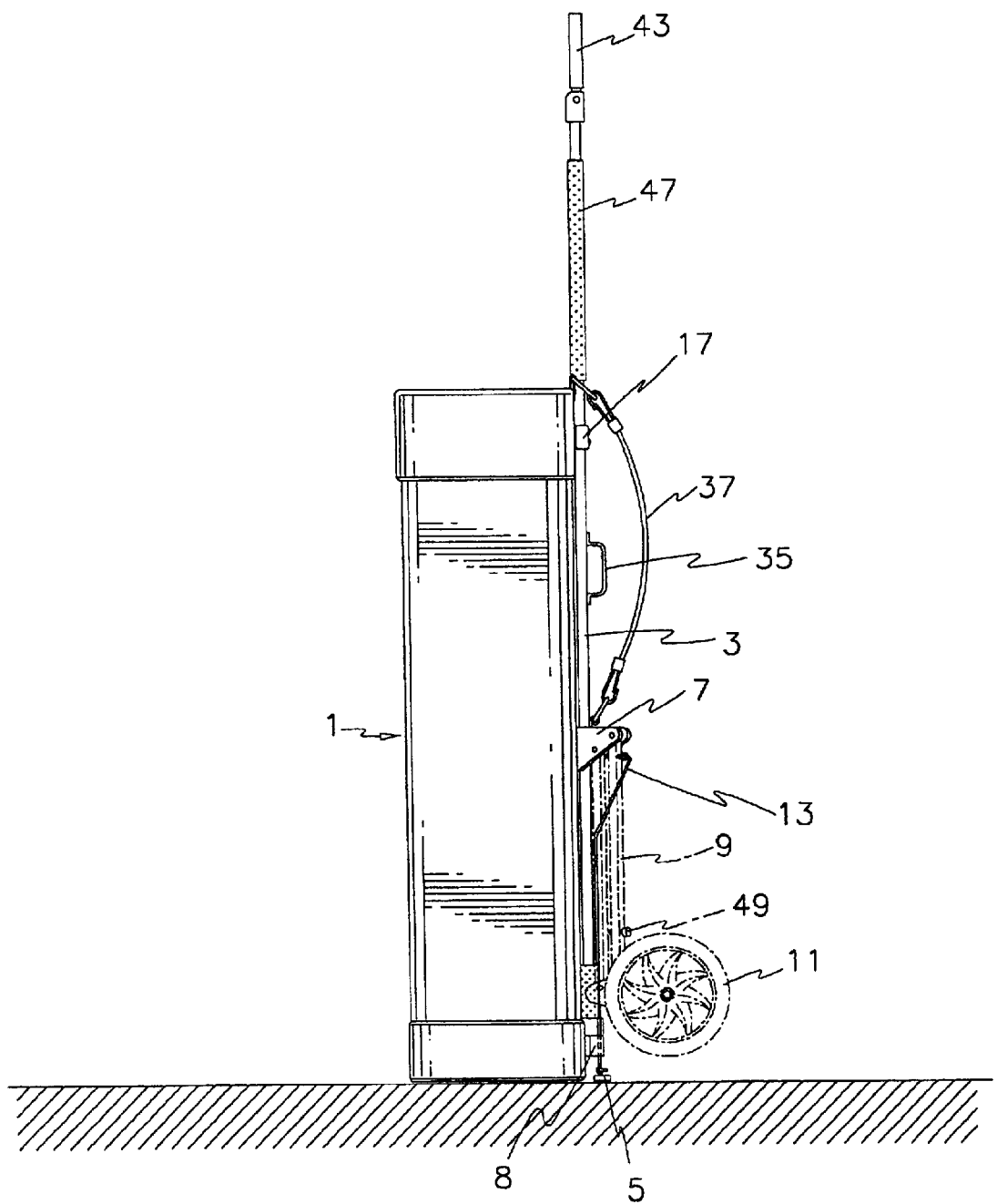
FIG. 12 is a side view of a golf bag cart according to a fourth preferred embodiment of the present invention.

FIG. 12 is a side view of a golf bag cart according to a fourth preferred embodiment of the present invention. As shown in FIG. 12, a guide member 8 is fixed to the lower end portion of the lateral surface of the bag 1, and the pressurizing member 5 is connected to the bottom end of the cart support 3 in a body such that it moves along the guide member 8.

Figure 13:
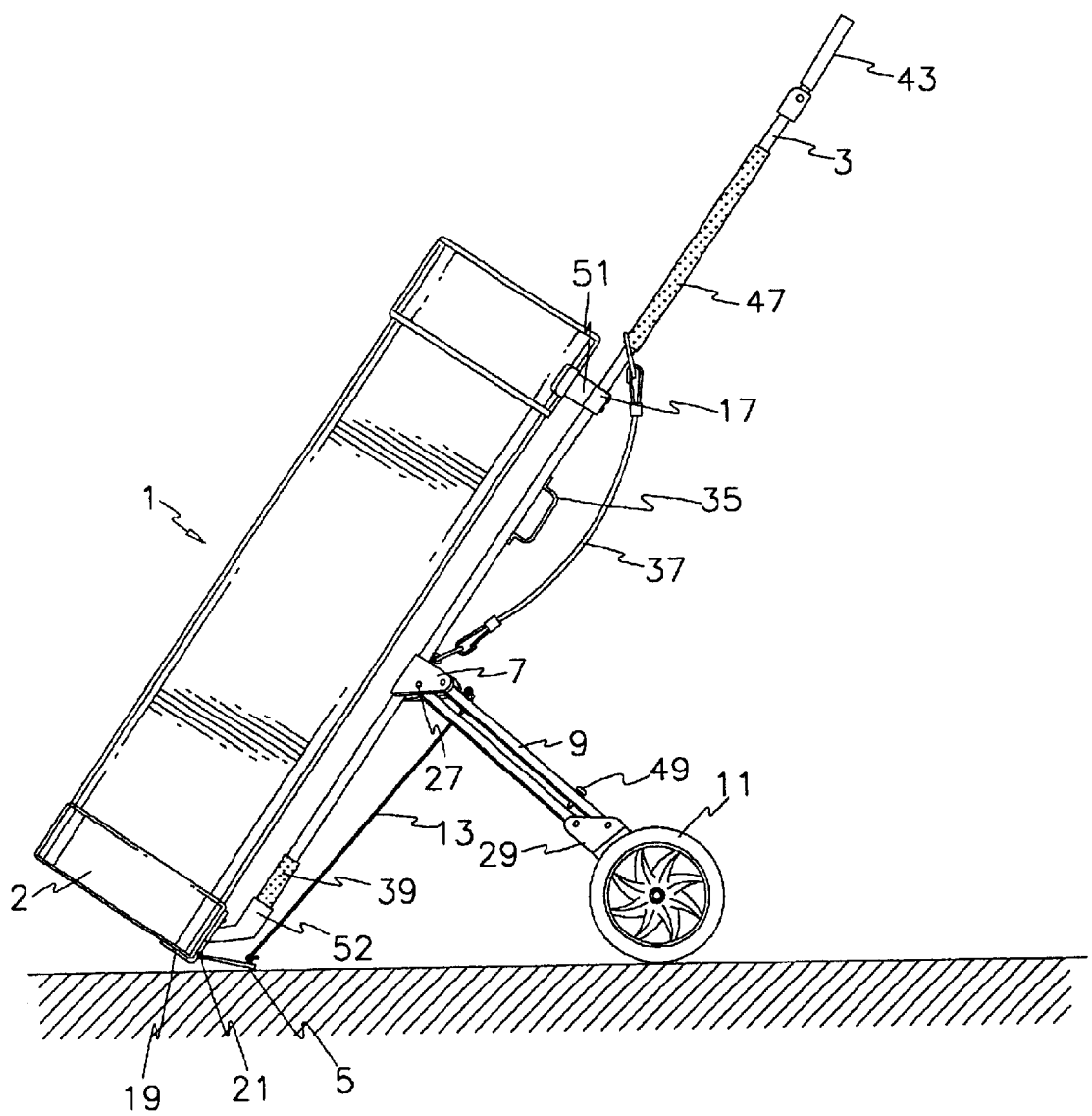
FIG. 13 is a side view of a golf bag cart according to a fifth preferred embodiment of the present invention.

FIG. 13 is a side view of a golf bag cart according to a fifth preferred embodiment of the present invention. As shown in FIG. 13, spacers 51 and 52 are provided between the cart support 3 and the bag 1 to space them apart from each other with a predetermined distance. In this structure, the cart support 3 does not hinder the movement of golf clubs 100 when they are inserted into the bag 1 or pull out thereof.

The spacers 51 and 52 are formed at the upper and lower brackets 17 and 19 of the bag 1 in a body such that the cart support 3 is positioned parallel to the bag 1 or inclined with respect to the latter.

In the above arrangement, the spacers 51 and 52 make the center of the wheel members 11 and the cart support 3 to become closer to each other, and this structure serves to improve stability of the golf bag cart.

Figure 14:
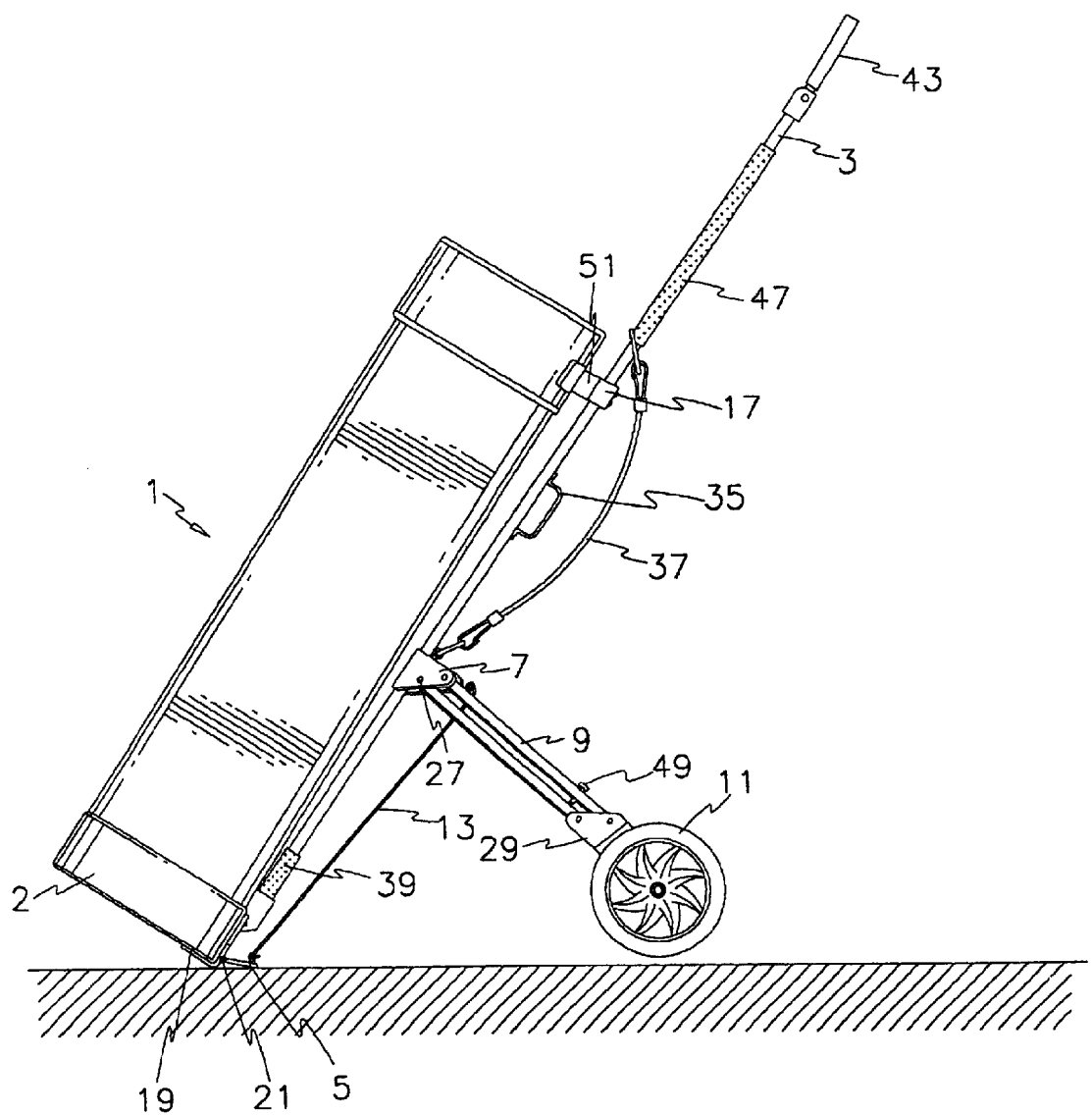
FIG. 14 is a side view of a golf bag cart according to a sixth preferred embodiment of the present invention.

FIG. 14 is a side view of a golf bag cart according to a sixth preferred embodiment of the present invention. As shown in FIG. 14, a spacer 51 is provided between the cart support 3 and the bag 1 to space them apart from each other.

The spacer 51 is formed at the upper bracket 17 of the bag 1 in a body such that the distance between cart support 3 and the bag 1 is gradually widened from the bottom side of the cart support 3 to the top side.

In the above structure, as the bag 1 is inclined with respect to the earth even when the cart support 3 is positioned to be parallel to the earth, the spacer 51 prevents the golf clubs 100 from slipping out of the bag 1.

Figure 15:
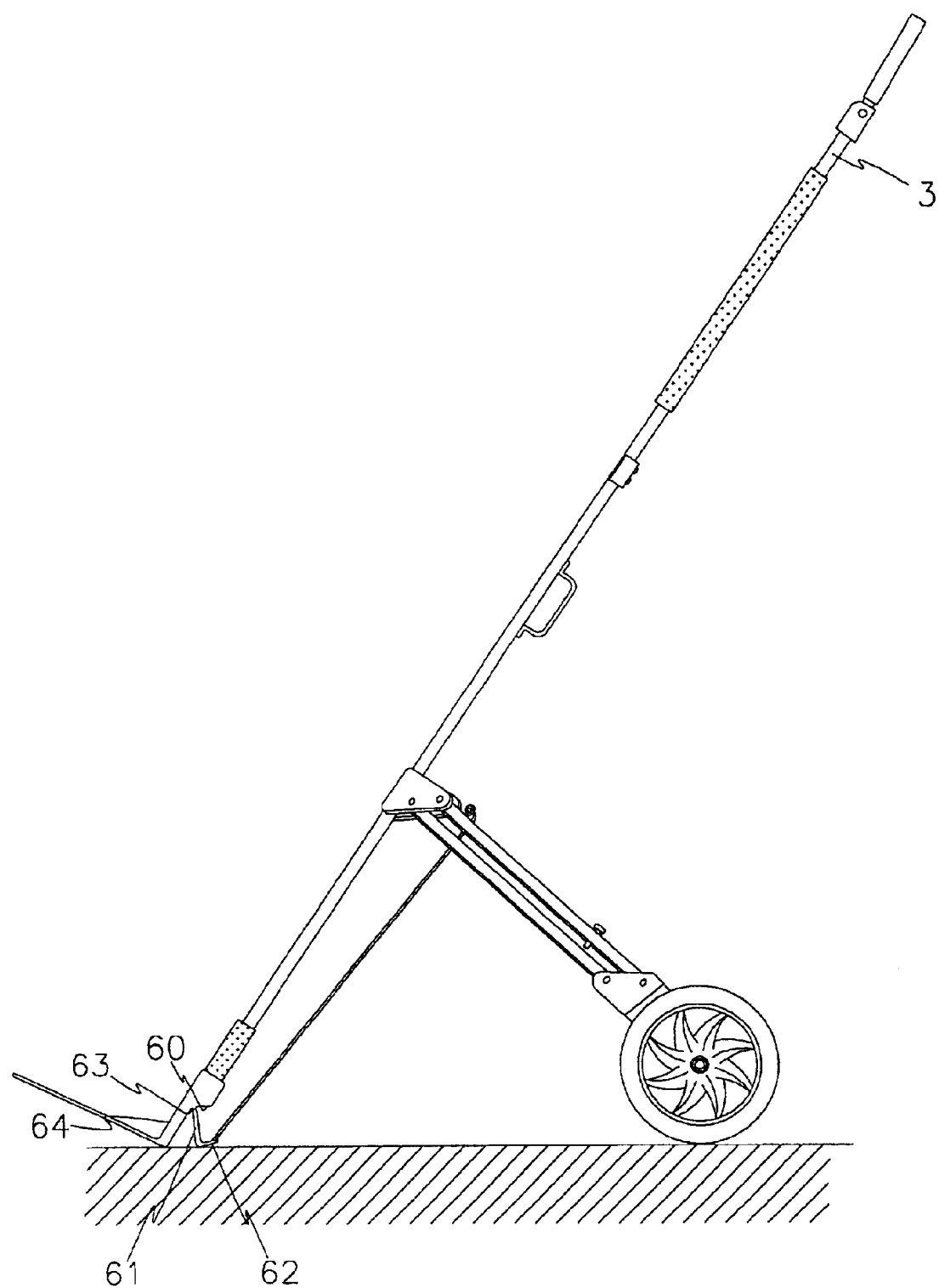
FIG. 15 is a side view of a golf bag cars according to a seventh preferred embodiment of the present invention.

FIG. 15 is a side view of a golf bag cars according to a seventh preferred embodiment of the present invention. As shown in FIG. 15, the bottom surface 64 of the cart support 3 is formed with an inclined portion 60, and the pressurizing member 61 is integrally connected to the lower portion of the inclined portion 60 like the forming method. In addition, the groove 63 can be formed at a connecting portion between the pressurizing member 61 and the bottom surface 64 of the cart support 3. Therefore, an end portion 62 of the pressurizing member 61 can be rotated when the cart is inclined.

Figure 16:
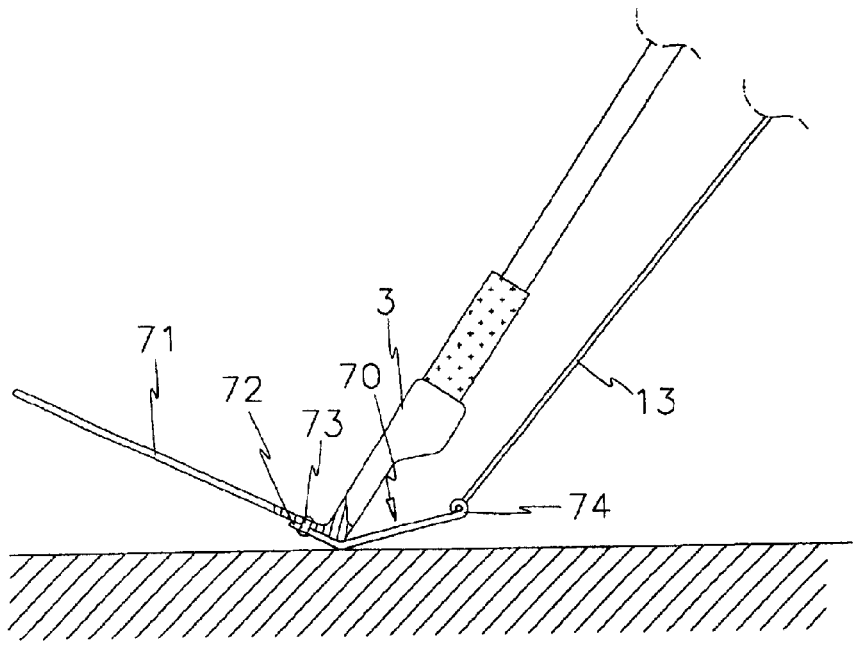
FIG. 16 is a side view of a golf bag cart according to an eighth preferred embodiment of the present invention.

FIG. 16 is a side view of a golf bag cart according to an eighth preferred embodiment of the present invention. As shown in FIG. 16, the pressurizing member 70 is connected to the lower portion 71 of the cart support 3 like the riveting joint method. That is, one end 72 of the pressurizing member 70 is connected to the lower portion 71 by a rivet 73 and the other end 74 of the pressurizing member 70 is connected to the link member 13. The pressurizing member 70 is made of an elastic material, so, the other end 74 of the pressurizing member 70 can be rotated when the cart is inclined.

Figure 17:
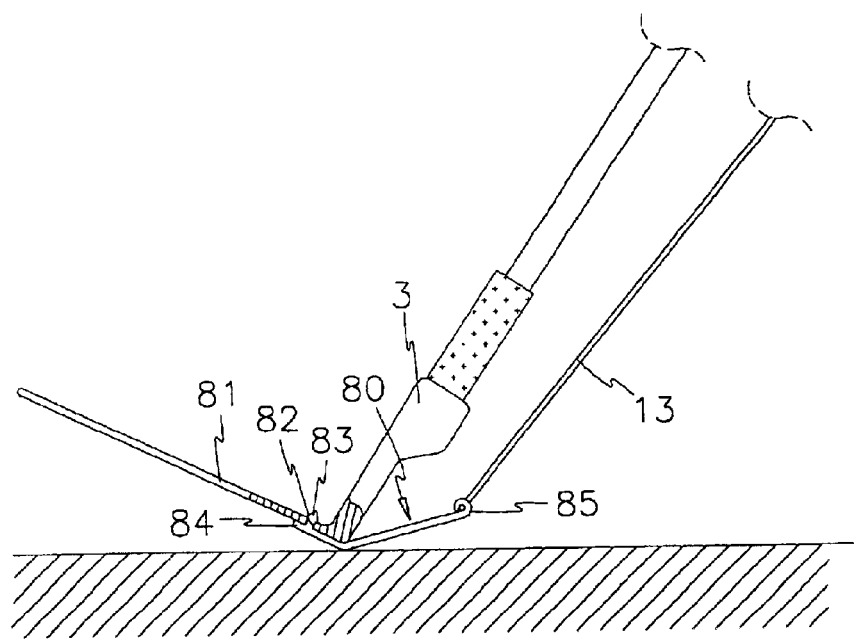
FIG. 17 is a side view of a golf bag cart according to a ninth preferred embodiment of the present invention.

FIG. 17 is a side view of a golf bag cart according to a ninth preferred embodiment of the present invention. As shown in FIG. 17, the pressurizing member 80 is connected to the lower portion 81 of the cart support 3 like the wedging joint method. That is, the lower portion 81 is formed with a hole 82, and a wedge portion 83 of one end 84 of the pressurizing member 80 is penetrated into the hole 82. Therefore, the pressurizing member 80 is connected to the lower portion 81 by the wedge portion 83. The other end 85 of the pressurizing member 80 is connected to the link member 13, so that the pressurizing member 80 can be rotated when the cart is inclined.

Figure 18:
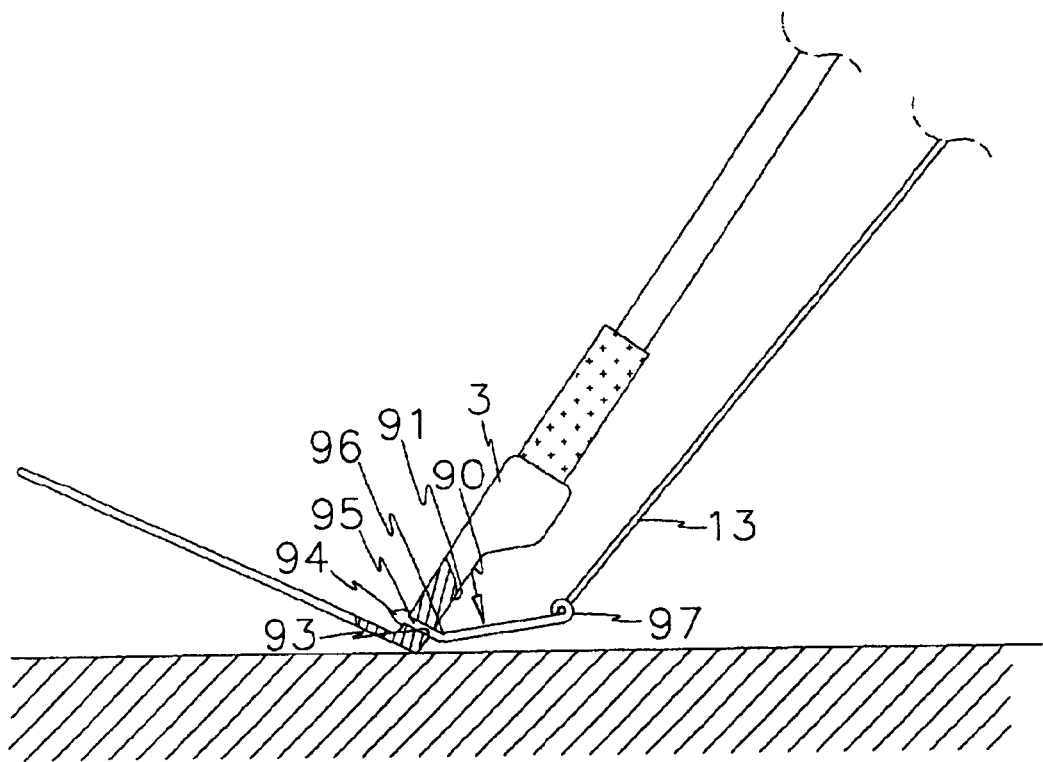
FIG. 18 is a side view of a golf bag cart according to a tenth preferred embodiment of the present invention.

FIG. 18 is a side view of a golf bag cart according to a tenth preferred embodiment of the present invention. As shown in FIG. 18, the pressurizing member 90 is connected to the front portion 91 of the cart support 3 like the wedging joint method. That is, the front portion 91 is formed with a hole 93, and a wedge portion 94 of one end 95 of the pressurizing member 90 is connected to the front portion 91 by the wedge portion 94. Also, the pressurizing member 90 is formed with a groove 96, and the other end 97 of the pressurizing member 90 is connected to the link member 13, so that the pressurizing member 81 can be rotated when the cart is inclined.

Figure 19:
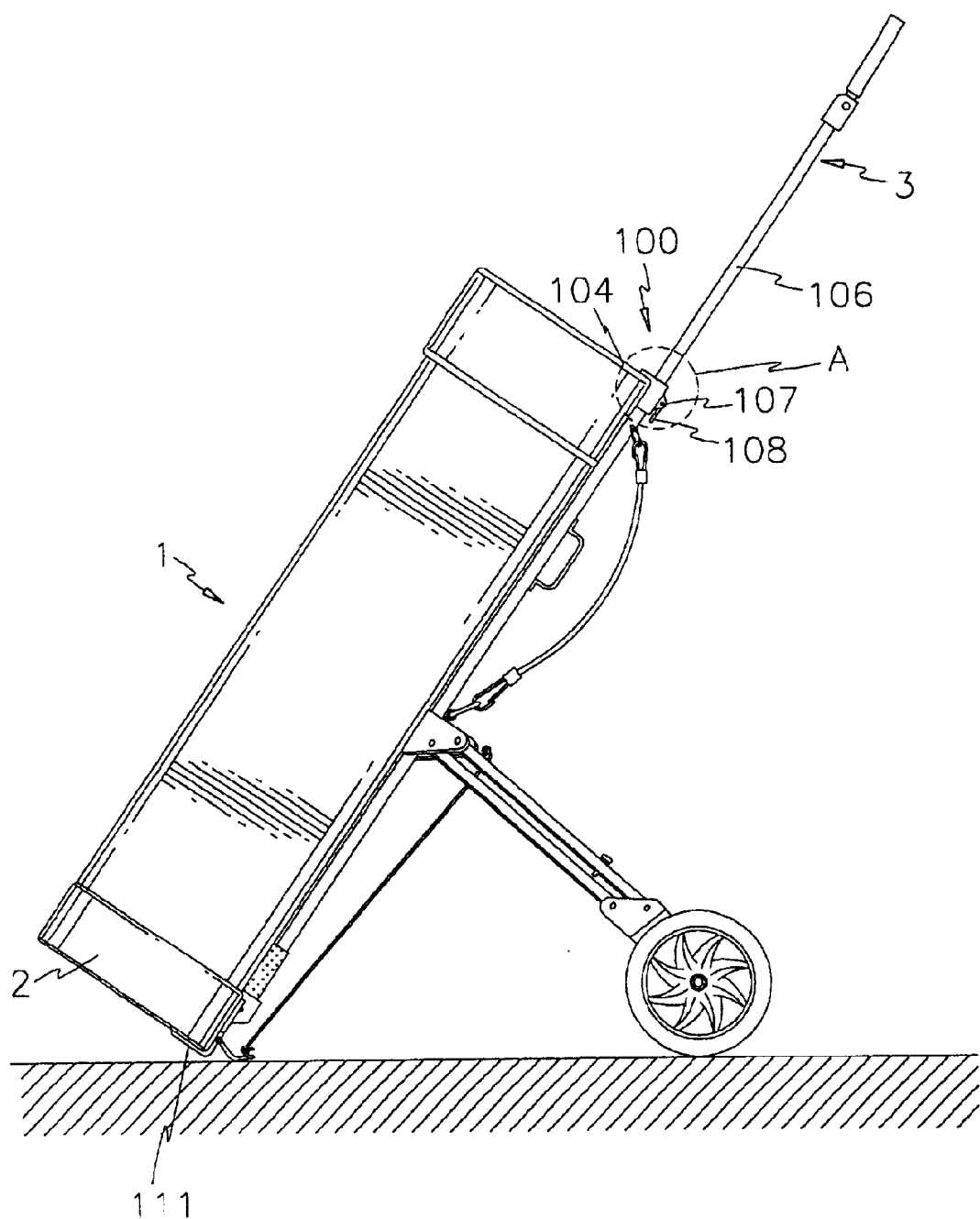
FIG. 19 is a side view showing a ratchet of a golf bag cart for fixing the bag to the cart support.
Figure 20:
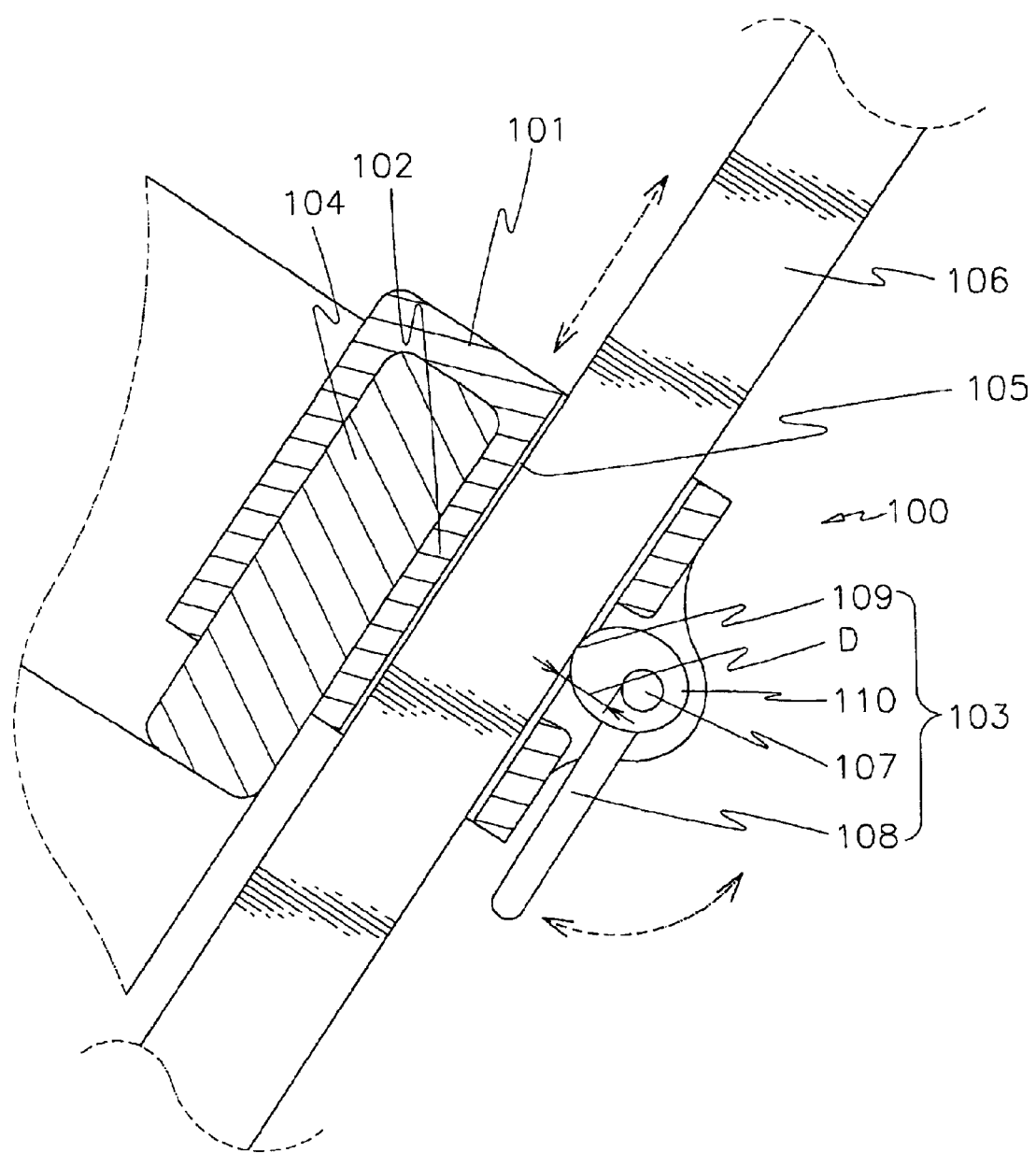
FIG. 20 is a partial exploded view showing the ratchet of FIG. 19.

FIG. 19 is a side view showing a clasp of a golf bag cart for fixing the bag to the cart support, and FIG. 20 is a partial exploded view showing the clasp of FIG. 19.

As shown In FIG. 19 and FIG. 20, the bag 1 can be fixed to the cart support 3 by a clasp 100. The clasp 100 has a bracket 101, a guide portion 102, and a fixing portion 103.

The bracket 101 is downwardly bent to be formed with an inner space such that an edge portion 104 of the bag 3 is inserted into the inner space.

The guide portion 102 has a hole 105 into which the frame 106 of the cart support 3 is inserted, such that the clasp, 100 slidably installed on the frame 100 so as to ascent or descend.

The fixing portion 103 comprises a hinge shaft 107, a handle 108 hingedly connected to the hinge shaft 107, and an eccentric portion 110 integrally formed at one end of the handle 108.

In the eccentric portion 110, the distance D between a center of the eccentric portion 110 to contacting point 109 is more long than other radius of the eccentric portion 110.

Therefore, when the handle 108 is rotated in a clockwise direction, the contacting point 109 makes contact with the outer surface of the frame 106, so the clasp 100 is fixed at a predetermined portion of the frame 106, and the bag 1 is fixed to the cart support 3 by the clasp 100. At this time, the bag 3 is supported by the lower portion 111 of the cart support 3.

On the other hand, when the handle 108 is rotated in an anti-clockwise direction, the contact point 109 is released from the state of contacting the outer surface of the frame 106. Therefore, the clasp 100 ascends along the frame, so the bag 3 can be separated from the cart support 3.

As described above, the inventive golf bag cart has advantage of simplified structure, reduced production cost, convenience in use, and easy movement free of spatial restriction Furthermore, when the golf bag is carried by picking up the holding handle or shouldering the string, the cart structure is kept to be constant without swaying so that possible safety problems can be prevented.

While the present invention has been described in detail with reference to the preferred embodiments, those skilled in the art will appreciate that various modifications and substitutions can be made thereto without departing from the spirit and scope of the present invention as set forth in the appended claims.

I claim:

1. A golf bag cart comprising:

a bag having an inner space;

a cart support on which the bag is loaded;

a pressurizing member fixed to the cart support such that the pressurizing member is rotated by a predetermined angle, the pressurizing member being pressurized against a ground surface and enduring the weight of the bag when the bag is inclined;

a plurality of left and right leg members movably fixed to a middle portion of the cart support via a fixture such that the leg members are arranged to form a predetermined angle with respect to the fixture, the leg members being folded by way of self weight when the bag is erected;

wheel members fixed to free ends of the left and right leg members via brackets such that the wheel members are rotated, the wheel members being folded by way of self weight together with the left and right leg members when the bag is erected; and a plurality of link members each having an end coupled to the pressurizing member, and an opposite end coupled to the leg members, the link members unfolding the leg members while being elevated when the pressurizing member is pressurized against the ground surface, and a clasp based on a lever and cam mechanism slidably installed on the cart support for fixing the bag to the cart support, wherein the clasp comprises a bracket which is downwardly bent to be formed with an inner space so that an edge portion of the bag is inserted into the inner space, wherein the clasp further comprises a guide portion having a hole into which a frame of the cart support is inserted into the hole so that the clasp slidably ascends or descends along the frame, wherein the clasp further comprises a fixing portion for fixing the clasp at a predetermined position, and wherein the fixing portion comprises a hinge shaft, a handle hingedly connected to the hinge shaft, and an eccentric portion integrally formed at one end of the handle, wherein the eccentric portion has a contacting point which is more apart from the center than any other radius of the eccentric portion.

2. The golf bag cart of claim 1, wherein the bag has an inclined portion at a bottom side thereof, and wherein the pressurizing member is integrally connected to a lower portion of the inclined portion.

3. The golf bag cart of claim 1, wherein the pressurizing member is connected to the lower portion of the cart support by a rivet.

4. The golf bag cart of claim 1, wherein the pressurizing member has a wedge portion at one end thereof, wherein the wedge portion is penetrated into a hole, and wherein the hole is located at a lower portion of the cart support.

5. The golf bag cart of claim 1, wherein the pressurizing member has a wedge portion at one end thereof, so that the wedge portion is penetrated into a hole, and wherein the hole is located at a front portion of the cart support.

6. A golf bag cart comprising:

a bag having an inner empty space for receiving a plurality of golf clubs, a wide lateral surface, and a narrow bottom surface;

a cart support on which the bag is loaded;

a pressurizing member integrally fixed to the cart support such that the pressurizing member is rotated by a predetermined angle, the pressurizing member being pressurized against a ground surface and enduring the weight of the bag when the bag is inclined by a predetermined angle;

a plurality of left and right leg members movably fixed to a middle portion of the cart support via a fixture such that the leg members are arranged to form a predetermined angle with respect to the fixture, the leg members being folded by way of self weight when the bag is erected, the fixture being rigidly fixed to the bag;

wheel members fixed to free ends of the left and right leg members via brackets such that the wheel members are rotated, the wheel members being folded by way of self weight together with the left and right leg members when the bag is erected; and a plurality of link members each having an end coupled to the pressurizing member, and an opposite end coupled to the leg members, the link members unfolding the leg members while being elevated when the pressurizing member is pressurized against the ground surface, and clasp based on a lever and cam mechanism slidably installed on the cart support for fixing the bag to the cart support, wherein the clasp comprises a bracket which is downwardly bent to be formed with an inner space so that an edge portion of the bag is inserted into the inner space, wherein the clasp further comprises a guide portion having a hole into which a frame of the cart support in inserted into the hole so that the clasp slidably ascends or descends along the frame, wherein the clasp further comprises a fixing portion for fixing the clasp at a predetermined position, and wherein the fixing portion comprises a hinge shaft, a handle hingedly connected to the hinge shaft, and an eccentric portion integrally formed at one end of the handle, wherein the eccentric portion has a contacting point which is more apart from the center than any other radius of the eccentric portion.

7. The golf bag cart of claim 6, wherein the bag has an inclined portion at a bottom side thereof, and wherein the pressurizing member is integrally connected to a lower portion of the inclined portion.

8. The golf bag cart of claim 6, wherein the pressurizing member is connected to the lower portion of the cart support by a rivet.

9. The golf bag cart of claim 6, wherein the pressurizing member has a wedge portion at one end thereof, wherein the wedge portion is penetrated into a hole, and wherein the hole is located at a lower portion of the cart support.

10. The golf bag cart of claim 6, wherein the pressurizing member has a wedge portion at one end thereof, so that the wedge portion is penetrated into a hole, and wherein the hole is located at a front portion of the cart support.

* * * * *